Figure 1:
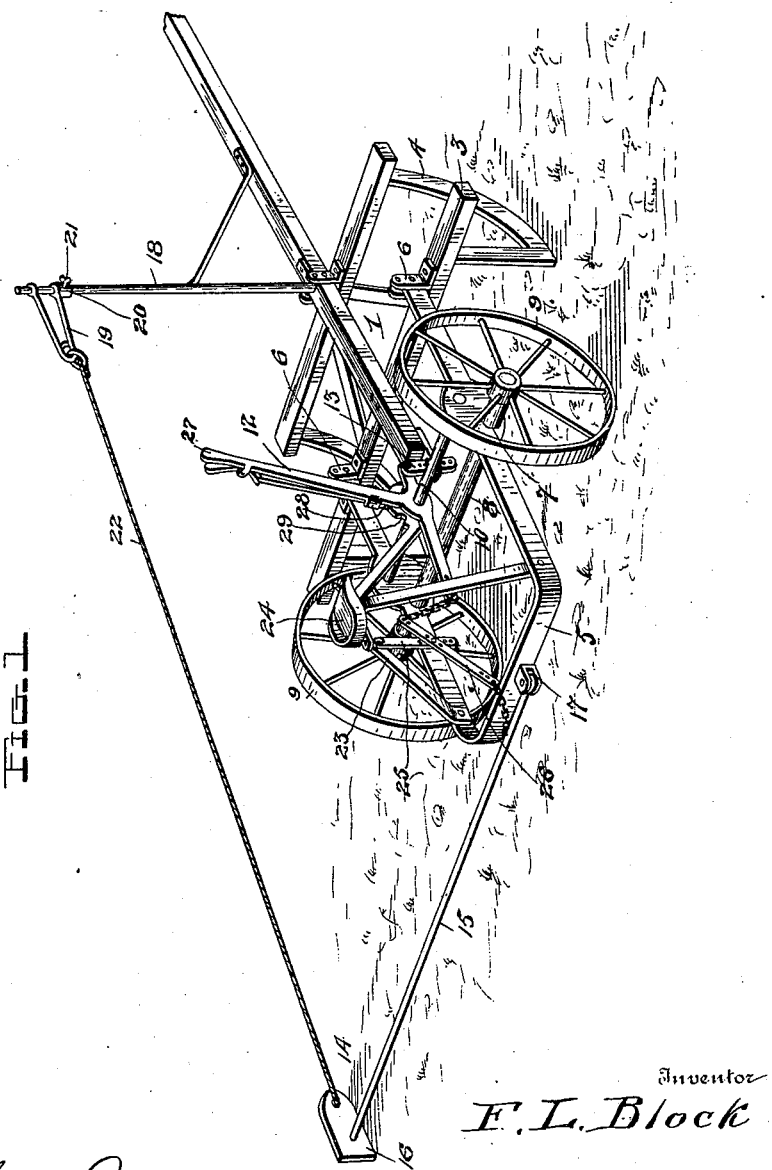

No. 691,436. Patented Jan. 21, 1902.
F. L. BLOCK.
ROW MARKER FOR AGRICULTURAL MACHINES.
(Application filed Nov. 4, 1901.)
(No Model.) 3 Sheets—Sheet 1.

Inventor
F. L. Block

Witnesses By Attorneys

No. 691,436. Patented Jan. 21, 1902.
F. L. BLOCK.
ROW MARKER FOR AGRICULTURAL MACHINES.
(Application filed Nov. 4, 1901.)
(No Model.) 3 Sheets—Sheet 2.
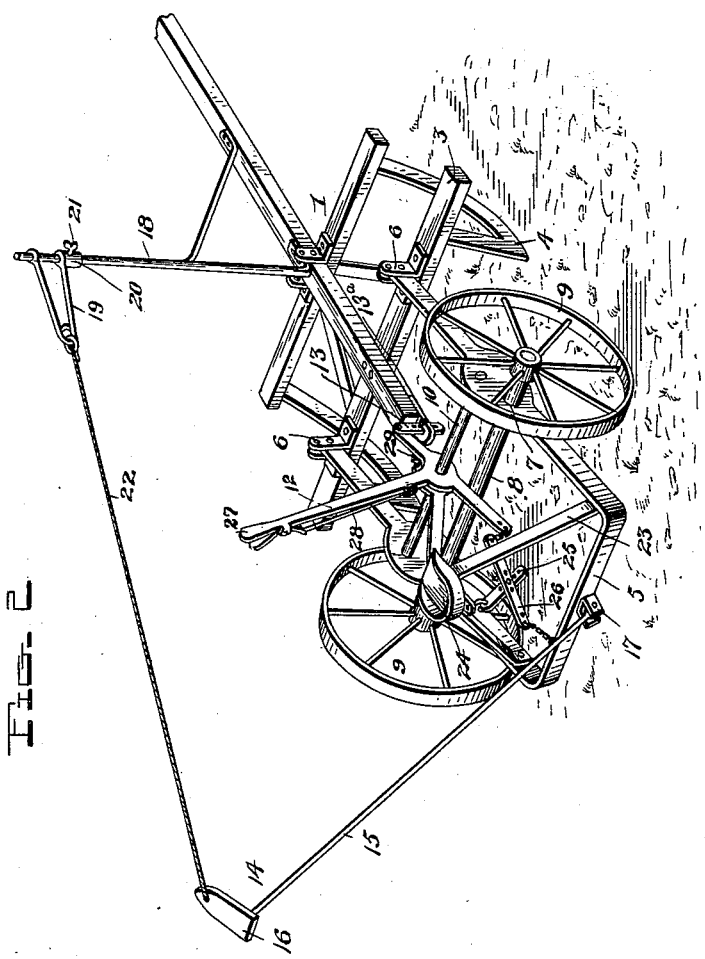
Witnesses
Inventor
F. L. Block
By H. R. Wilson &co.
Attorneys No. 691,436. Patented Jan. 21, 1902.
F. L. BLOCK.
ROW MARKER FOR AGRICULTURAL MACHINES.
(Application filed Nov. 4, 1901.)
(No Model.) 3 Sheets—Sheet 3.
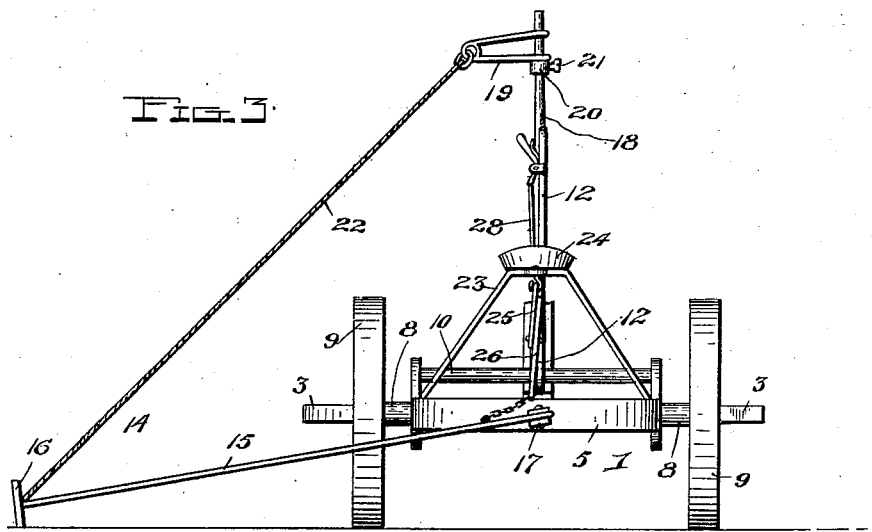
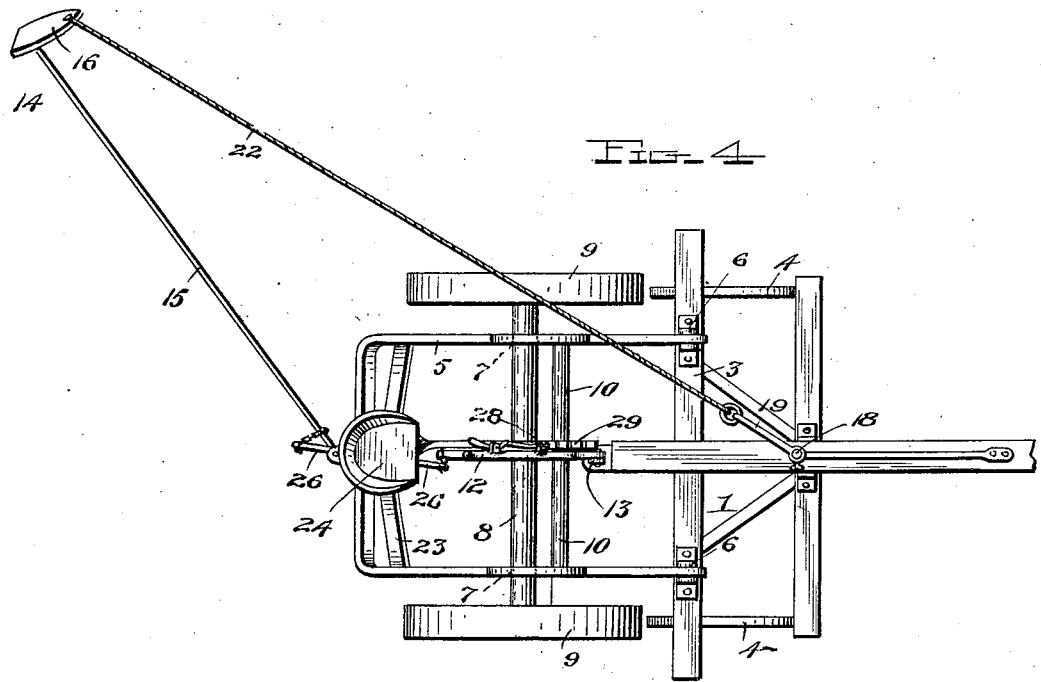
Inventor
F. L. Block

UNITED STATES PATENT OFFICE.

FRANCIS L. BLOCK, OF SIDNEY, ILLINOIS.

ROW-MARKER FOR AGRICULTURAL MACHINES.

SPECIFICATION forming part of Letters Patent No. 691,436, dated January 21, 1902.

Application filed November 4, 1901. Serial No. 81,095. (No model.)

*To all whom it may concern:*

Be it known that I, FRANCIS L. BLOCK, a citizen of the United States, residing at Sidney, in the county of Champaign and State of Illinois, have invented certain new and useful Improvements in Row-Markers for Agricultural Machines; and I do declare the following to be a full, clear, and exact description of the invention, such as will enable others skilled in the art to which it appertains to make and use the same.

The invention relates to row-markers for agricultural machines, and more particularly for seeders of the corn-planter type.

The object of the invention is to provide means of this character which shall be simple of construction, durable in use, comparatively inexpensive of production, and under complete control of the driver, who at will may throw the marker-shoe from one side of the machine to the other or elevate it to a position out of use and in this movement simultaneously elevate the runners of the seed-planting machine, special provision being made to prevent in the swinging adjustment of the marker interference with the driving-lines.

With these and other objects in view the invention consists of certain novel features of construction, combination, and arrangement of parts, which will be hereinafter more fully described, and particularly pointed out in the appended claims.

In the accompanying drawings, Figure 1 is a perspective view, conventionally illustrated, of the frame of a seed-planting machine, illustrating the application of the invention thereto and showing the marker-shoe in position for use. Fig. 2 is a similar view, with the marker-shoe and runners of the seed-planting machine elevated from the ground. Fig. 3 is a rear view when the parts are in the position shown in Fig. 1. Fig. 4 is a top plan view when the parts are in the position shown in Fig. 2.

Referring to the drawings, 1 denotes the front or runner frame of an agricultural machine, which in the present instance is conventionally represented as that of a corn-planter and which consists of cross-pieces 3, suitably braced and connected to the tongue or pole of the machine, and the usual runners 4, secured to said cross-pieces.

5 denotes a wheel or rear frame, preferably U-shaped, vertically adjustable and hinged at its forward end to lugs 6, secured to the cross-pieces of the runner-frame and provided with bearings 7, in which is journaled the axle 8 of supporting-wheels 9.

10 denotes a cross-shaft journaled in the wheel-frame above the axle, and 12 denotes an operating-lever pivoted to this cross-shaft and connected at its forward end by a link 13 to the rear end of the tongue or pole of the runner-frame. This connection is preferably adjustable and is effected by providing the rear end of the tongue or pole with a notched plate 13ª, through which the link extends, and forming said link with a vertical row of apertures to receive a cotter-pin or other fastening device. This adjustment enables me to compensate for wear, take up looseness, and also regulate the elevation of the runners.

14 denotes a marker, which consists of a rod 15 and a shoe 16, secured to its rear end. The inner end of the marker-rod is pivoted to a swiveled head 17, which is swiveled to the rear end of the wheel-frame.

18 denotes an anchor-post secured to the tongue or pole of the front or runner frame and suitably braced, as shown.

19 denotes an arm swiveled to the upper end of the anchor-post and supported by a collar 20, retained in vertical adjustment on said post by a set-screw 21, and 22 denotes the anchor-rope, connected to the swiveled arm and to the shoe of the marker. The set-screw and collar permit of the adjustment of the swiveled arm to raise it above and out of the way of the drive-lines, and thereby avoid any interference of one with the other in the handling of the machine.

23 denotes the seat-frame, secured to the wheel-frame, and 24 the seat, secured to the seat-frame.

25 denotes a link loosely connected to the upper end of the seat-frame, and 26 denotes a lever adjustably pivoted to said link and connected at one end by a chain or other flexible connection to the inner end of the marker-rod and adjustably connected at its other end by a chain or other flexible connection to the inner end of the operating-lever.

Any suitable means may be employed for actuating the operating-lever 12; but that shown consists of a handle 27, secured to said lever and projecting within convenient reach of the driver and provided with a spring-actuated locking-dog 28, which is adapted to engage the teeth of a segmental rack 29 and hold said operating-lever in the desired adjustment.

In operation, assuming the machine to be drawn along by the draft-animals and the parts to be in the position shown in Fig. 1 of the drawings, in which position the runners of the planter are shown in engagement with the ground and the marker-shoe engaging the ground on the left-hand side of the machine, to elevate the runners and throw the marker into the position shown in Fig. 2 of the drawings the operating-lever is actuated, for instance, by pulling the handle rearwardly. This movement rocks said lever upon its shaft, throwing upwardly its forward end and downwardly its rear end. This causes the runners to be raised from engagement with the ground and elevates the marker, as shown in Fig. 2. Now if it be desired to throw the marker to the opposite side of the machine by giving the handle a quick sharp rearward pull the marker will be thrown from the inclined position shown in Fig. 2, where it leans toward the left of the machine, to a leaning position on the right of the machine. If it be desired now to lower the marker and runners into engagement with the ground, the handle is moved forwardly, thus lowering the forward end of the operating-lever and elevating its rear end.

From the foregoing description, taken in connection with the accompanying drawings, the construction, mode of operation, and advantages of my invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. The combination with the front or runner frame, of a wheel or rear frame hinged thereto, a pivoted lever one end of which is connected to the front or runner frame, a marker swiveled to the wheel-frame, a pivoted link, a lever pivoted to said link and having one end loosely connected with the rear end of the first-named lever and its other end loosely connected with the marker, substantially as set forth.

2. The combination with the front or runner frame, of a rear or wheel frame hinged thereto, a pivoted lever one end of which is connected to the front or runner frame, a marker swiveled to the wheel-frame, a pivoted link, a lever pivoted to said link and having one end loosely connected with the rear end of the first-named lever and its other end loosely connected with the marker, an anchor-post secured to the front or runner frame, a vertically-adjustable swiveled arm carried by said post, and a flexible connection between the swiveled arm and the shoe of the marker, substantially as set forth.

In testimony whereof I have hereunto set my hand in presence of two subscribing witnesses.

FRANCIS L. BLOCK.

Witnesses:
　AMEL O. BLOCK,
　G. H. HACKBARTH.